United States Patent
Huang

(10) Patent No.: US 8,903,992 B2
(45) Date of Patent: Dec. 2, 2014

(54) TRIGGER METHOD OF COMPUTATIONAL PROCEDURE FOR VIRTUAL MACHINE MIGRATION AND APPLICATION PROGRAM FOR THE SAME

(75) Inventor: Wen-Min Huang, Taoyuan County (TW)

(73) Assignee: Delta Electronics, Inc. (TW)

( * ) Notice: Subject to any disclaimer, the term of this patent is extended or adjusted under 35 U.S.C. 154(b) by 160 days.

(21) Appl. No.: 13/468,537

(22) Filed: May 10, 2012

(65) Prior Publication Data

US 2013/0151696 A1  Jun. 13, 2013

(30) Foreign Application Priority Data

Dec. 12, 2011 (TW) .............................. 100145709 A

(51) Int. Cl.
G06F 11/30 (2006.01)
G06F 15/173 (2006.01)

(52) U.S. Cl.
USPC ......................................... 709/224; 709/226

(58) Field of Classification Search
CPC .............. G06F 11/301; G06F 11/3058; G06F 11/3433; G06F 11/2046; G06F 17/303; G06F 11/1482; G06F 2201/815
USPC ................................................. 709/224, 226
See application file for complete search history.

(56) References Cited

U.S. PATENT DOCUMENTS

| | | | |
|---|---|---|---|
| 6,075,938 A | 6/2000 | Bugnion | |
| 6,856,943 B2 * | 2/2005 | Murphy et al. | ............... 702/186 |
| 8,346,919 B1 * | 1/2013 | Eiriksson et al. | ............. 709/224 |
| 2002/0120727 A1 * | 8/2002 | Curley et al. | .................. 709/223 |
| 2003/0014128 A1 * | 1/2003 | Pathak et al. | .................... 700/14 |
| 2003/0217144 A1 * | 11/2003 | Fu et al. | ......................... 709/224 |
| 2006/0195715 A1 * | 8/2006 | Herington | .......................... 714/4 |
| 2008/0222375 A1 * | 9/2008 | Kotsovinos et al. | .......... 711/162 |
| 2009/0172125 A1 * | 7/2009 | Shekhar et al. | ............... 709/215 |
| 2009/0198817 A1 * | 8/2009 | Sundaram et al. | ............ 709/227 |
| 2010/0061240 A1 * | 3/2010 | Sindhu et al. | ................. 370/235 |
| 2010/0235654 A1 * | 9/2010 | Malik et al. | ................... 713/300 |
| 2011/0072208 A1 * | 3/2011 | Gulati et al. | .................. 711/114 |
| 2011/0145471 A1 * | 6/2011 | Corry et al. | ....................... 711/6 |
| 2011/0252418 A1 * | 10/2011 | Havivi et al. | ...................... 718/1 |

(Continued)

FOREIGN PATENT DOCUMENTS

| | | |
|---|---|---|
| TW | 201110645 | 3/2011 |
| TW | 201118738 | 6/2011 |

OTHER PUBLICATIONS

Office Action dated Dec. 18, 2013 from corresponding application No. TW 100145709.

Primary Examiner — Kostas Katsikis
(74) Attorney, Agent, or Firm — Lowe Hauptman & Ham, LLP

(57) ABSTRACT

A method of triggering a computational procedure for virtual machine migration includes receiving by a cloud server, reply connection data from a client end host, and determining if the computational procedure for virtual machine migration is initiated according to the reply connection data. The virtual machine migration is performed upon completion of the computational procedure. A browser intercepts the reply connection data to reply to the cloud server when the client end host accesses a web page via the browser. The reply connection data from the client end host is used for determining whether the computational procedure is initiated or not so as to lower a cloud server computation load by reducing the computational procedures performed.

20 Claims, 5 Drawing Sheets

(56) References Cited

U.S. PATENT DOCUMENTS

| | | |
|---|---|---|
| 2012/0042034 A1* | 2/2012 | Goggin et al. ............... 709/216 |
| 2012/0042312 A1* | 2/2012 | Isci et al. ........................ 718/1 |
| 2012/0054367 A1* | 3/2012 | Ramakrishnan et al. ..... 709/242 |
| 2012/0066677 A1* | 3/2012 | Tang ............................... 718/1 |
| 2012/0096459 A1* | 4/2012 | Miyazaki ........................ 718/1 |
| 2012/0136989 A1* | 5/2012 | Ferris et al. ................... 709/224 |
| 2012/0215373 A1* | 8/2012 | Koblenz et al. ............... 700/300 |
| 2012/0246107 A1* | 9/2012 | Beaty et al. ..................... 706/52 |
| 2012/0297307 A1* | 11/2012 | Rider et al. ................... 715/736 |
| 2012/0303790 A1* | 11/2012 | Singh et al. ................... 709/224 |
| 2013/0128455 A1* | 5/2013 | Koblenz et al. ............... 361/692 |
| 2013/0191658 A1* | 7/2013 | Malik et al. ................... 713/300 |

* cited by examiner

TRIGGER METHOD OF COMPUTATIONAL PROCEDURE FOR VIRTUAL MACHINE MIGRATION AND APPLICATION PROGRAM FOR THE SAME

BACKGROUND OF THE INVENTION

1. Field of the Invention

One or more embodiments of the present invention relates to a computational procedure for virtual machine migration used on servers, and in particular, to a trigger method to determine when to initiate computational procedure for virtual machine migration.

2. Description of Prior Art

As the semiconductor industry develops the capabilities of computer increases rapidly in recent years. Accordingly, the processing efficiency and speeds of a server also grow significantly.

In terms of increasing server efficiency, virtual servers are gradually becoming popular. The concept of virtual servers refers to that many virtual machines (VM) are programmed in a physical server and the multiple VMs simultaneously execute multiple service procedures. An administrator maintains one physical server and is able to provide different service procedures to server users via multiple VMs, which lowers the cost of manpower, space and electrical power. The virtual machines individually work with different operating system (OS), which expand the compatibility of the server to meet the requirements of different server users.

The multiple virtual machines on the server share the physical memory of the server for executing the service procedures. VM is useful when a certain service procedure is simultaneously used by too many users and occupies the majority of the physical memory in the server, or when one of the virtual machines has heavy computing loading which may lead to network congestion or overheated servers and impact on the overall processing efficiency.

In view of that, a plurality of servers in a system is scheduled with periodic virtual machines migration. The system executes computational procedure based on the using status of the VMs. The computational procedure individually computes the most suitable location to migrate the VMs. The system moves the VMs to the most suitable locations based on calculation results. In further details, the computational procedure moves the memory data processed in the servers to the suitable server to continue with the processing based on the calculation results.

The above computational procedure calculates according to the network speed, the CPU capability, the memory usage status, the temperature, the humidity of the location, or the rack location of each server. The computing result indicates which server is the most suitable server to process the VMs. The system then moves the VMs, i.e. the processing memory data in the server, to the most suitable location based on the calculation results.

For example, service procedures used by many people typically take up larger memory space and more CPU resources. After the computing, the servers may become overheated as a result. The computational procedure selects a server at a location with better ventilation, better air conditioning, lower temperature and under a lower hardware computing load to be the server processing the above mentioned service procedure.

To assure the servers of a system continue to deliver the best connection quality, the above mentioned computational procedure is executed periodically, for example, once every ten or twenty seconds. The system executes migration after the computing. Nonetheless, when there are more factors taken in the computational procedure, the computation load and the occupied system resource grows. If the frequency of executing the computational procedures is high, the server resource is heavily occupied which is counterproductive by lowering the users' share of the server.

Thus, it is desired in the market to provide an innovative mechanism to assure the server effectively determining the timing to execute the computational procedure and optimize virtual machines, and does not in appropriately occupy server resource by frequently executing the computational procedure.

SUMMARY OF THE INVENTION

The primary objective of the present invention is provide a trigger method of computational procedure for virtual machine migration and an application program for the same to effectively determining the when to initiate the computational procedure.

In order to achieve the above objective, a cloud server is used to simultaneously receive reply connection data from a client end host, and determining if it is required to initiate computational procedure of virtual machine migration based on the connection data. The virtual machine migration is executed after the computational procedure completes. The client end host accesses to web page via the browser and the browser intercepts the above mentioned connection data to reply to the server.

Compare with the prior art, the present invention provides advantages including that the server end continues to receive the reply connection data from the client end host, determine when to initiate the computational procedure based on connection data and execute the virtual machines migration after the computing. Thus, computational procedures are executed only when the system determines that the computational procedures are required which keep the server resource from occupying by executing the computational procedures.

In addition, to assure the best connection quality provided by the server, the server periodically executes the computational procedure. With the method of the present invention, the periodic execution interval can be longer, for example from once every several seconds to once every several minutes so as to avoid the limited server resource is consumed by the massive computation load created by frequent execution of the computational procedure.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
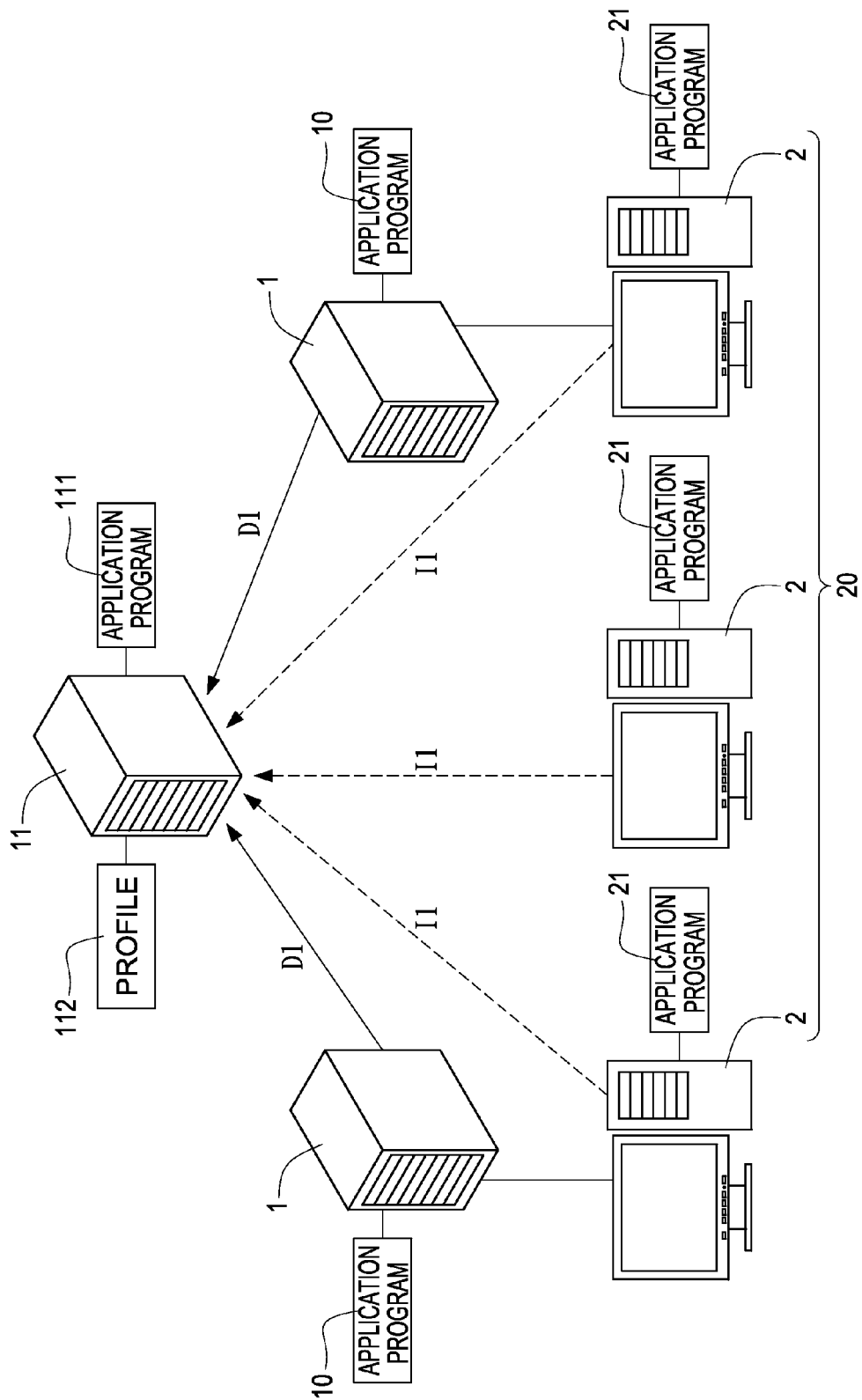
FIG. 1 is a system architecture diagram of a preferred embodiment according to the present invention.

In cooperation with attached drawings, the technical contents and detailed description of the present invention are described thereinafter according to preferable embodiments FIG. 1 is a system architecture diagram of a preferred embodiment according to the present invention. An application program 111 is installed in a plurality of cloud servers 1. In further details, the plurality of servers 1 comprise a monitor server 11. The application program 111 is installed in the monitor server 11. When the application program 111 is loaded and executed at the monitor server 11, the monitor server 11 is able to execute the trigger method of computational procedure for virtual machine migration according to the present invention.

At least one virtual machine (Virtual Machine, VM) is individually provided in the plurality of servers 1, and the virtual machines individually provide service procedures. The plurality of servers 1 individually connected with the monitor server 11, and an application program 10 is individually installed in each server 1. Each server 1 individually intercepts the internal server data D1 via the application program 10, for example the network speed, the CPU capability, the memory usage status, the temperature, the humidity of the location, or the rack location of each server, and transfers the server data D1 to the monitor server 11. Thus, before each server 1 performs the virtual machine migration, one of the plurality of servers 1 executes computational procedure for the virtual machines migration based on the server data D1 for indicating the most suitable location for executing each virtual machine. Then each virtual machines migration is performed based on the calculation result.

It should be mentioned that the computational procedure is executed by the monitor server 11. As a matter of fact, the computational procedure can also be executed by any of the plurality of servers 1, and is not limited thereto. In the present embodiment, the quantity of the plurality of servers 1 is three (including two servers 1 and a monitor server 11), the quantity of the servers 1 is subject to requirements and is not limited thereto.

The client end 20 connects to the virtual machines of each server 1 via at least one client end host 2, such as a desktop, a tablet and smart phone, for using service procedures provided by the virtual machines, such as accessing to web page or read/write to web hard drive etc. In the present invention, when the client end hosts 2 connects to the plurality of servers 1 for using the service procedure, the client end hosts 2 intercepts a connection data I1 (for example reply time of the web page, or satisfaction survey results of users). The connection data I1 is replied to one of the plurality of servers 1 and specifically replied to the monitor server 11. The monitor server 11 calculates on the plurality of the connection data I1 from the client end hosts 2 for determining if executing the above mentioned computational procedure or not.

Figure 4:
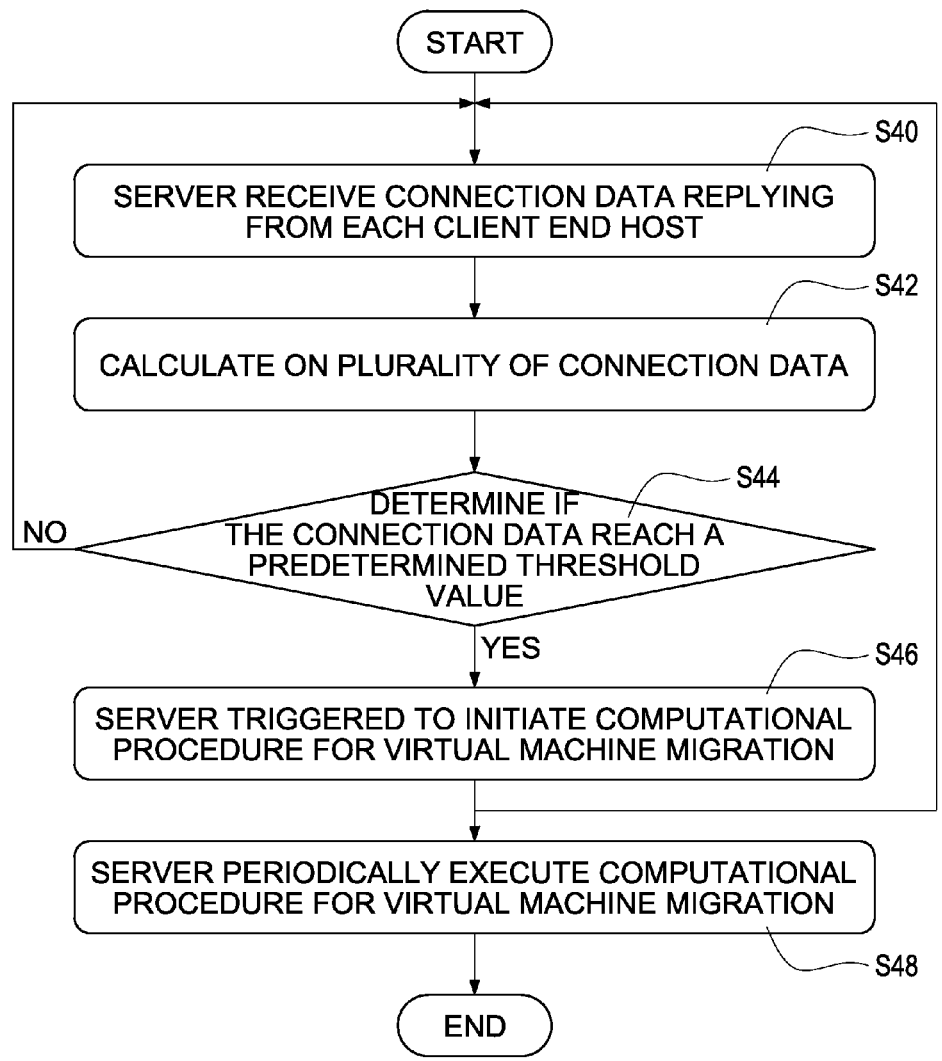
FIG. 4 is a judgment flowchart e of a preferred embodiment according to the present invention.

FIG. 4 is a judgment flowchart e of a preferred embodiment according to the present invention. First, one of the plurality of servers 1 receives the connection data I1 from each client end host 2 (step S40). Specifically, the monitor server 11 receives the connection data I1. Next, the monitor server 11 calculates on the received plurality of the connection data I1 (step S42) and determines if the connection data I1 reaches a predetermined threshold value based on calculation results (step S44).

In the embodiment, the monitor server 11 is pre-installed with at least one profile 112 (the profile 112 shown in FIG. 1). The conditions to execute the computational procedure is predetermined by the administrator are recorded in the profile 112. In the step S44, the monitor server 11 compares the connection data I1 with the profile 112 after the calculation for determining if the connection data I1 reaches the predetermined threshold value. It should be mentioned that the monitor server 11 may comprise multiple profiles 112. Each profile 112 has execution conditions individually corresponding to different service procedures. The connection data I1 replied from each client end host 2 may comprise connection addresses from each client end host 2. The monitor server 11 intercepts the connection address from the received connection data I1 for determining the client end host 2 should connect to which service procedure, and further determining which profile 112 to compare with.

For example, when the client end host 2 accesses to a text web page, the reply time is typically short. In contrast, when the client end host 2 accesses to a web page using many FLASH animations, the reply time may be long. Accordingly, the monitor server 11 is installed with the profile 112 with more strict execute conditions (for example, the executing conditions are more than 2% of the total user quantity, and the reply time is longer than 1 second), and also installed with the other profile 112 with less strict execute conditions (for example, the executing conditions are more than 5% of the total user quantity and the reply time is longer than 3 seconds). The monitor server 11 selects different profile 112 to perform comparison for determining if it is required to execute the computational procedure based on different service procedures the client end host 2 connects to.

After the step S44, if the monitor server 11 determines the connection data I1 does not reach the predetermined threshold value, the method moves back to the step S40 and continues to receive, calculate and analyze on the connection data I1 replied from each client end host 2.

If the monitor server 11 determines that the connection data I1 reaches the predetermined threshold value in the step S44, one of the plurality of servers 1 is triggered to initiate the computational procedure for virtual machine migration (step S46). Specifically, g triggering the monitor server 11 is triggered to execute the above mentioned computational procedure, but is not limited thereto. After the step S46, the plurality of servers 1 perform the virtual machine migration based on the calculation results of the computational procedure. When the computational procedure or the migration is completed, the method moves back to the step S40, the monitor server 11 continues to receive the connection data I1 from each client end host 2.

Nonetheless, in order to provide the best connection quality to the servers 1, one of the servers 1 (or the monitor server 11) is required to periodically execute the computational procedure for virtual machine migration (step S48). The monitor server 11 efficiently determines when to execute the computational procedure based on the connection data I1 replied from the client end hosts 2 the trigger method of the present invention. Though, it is required to execute the computational procedure periodically executing, the executing interval is configurable to a longer time period, for example from once every ten or twenty seconds to once every several minutes or tens of minutes without impacting on the safety and connection quality of the servers 1. The resource of the servers 1 is spared and the efficiency of the servers 1 is not influenced by the frequent execution of the computational procedure.

Figure 2:
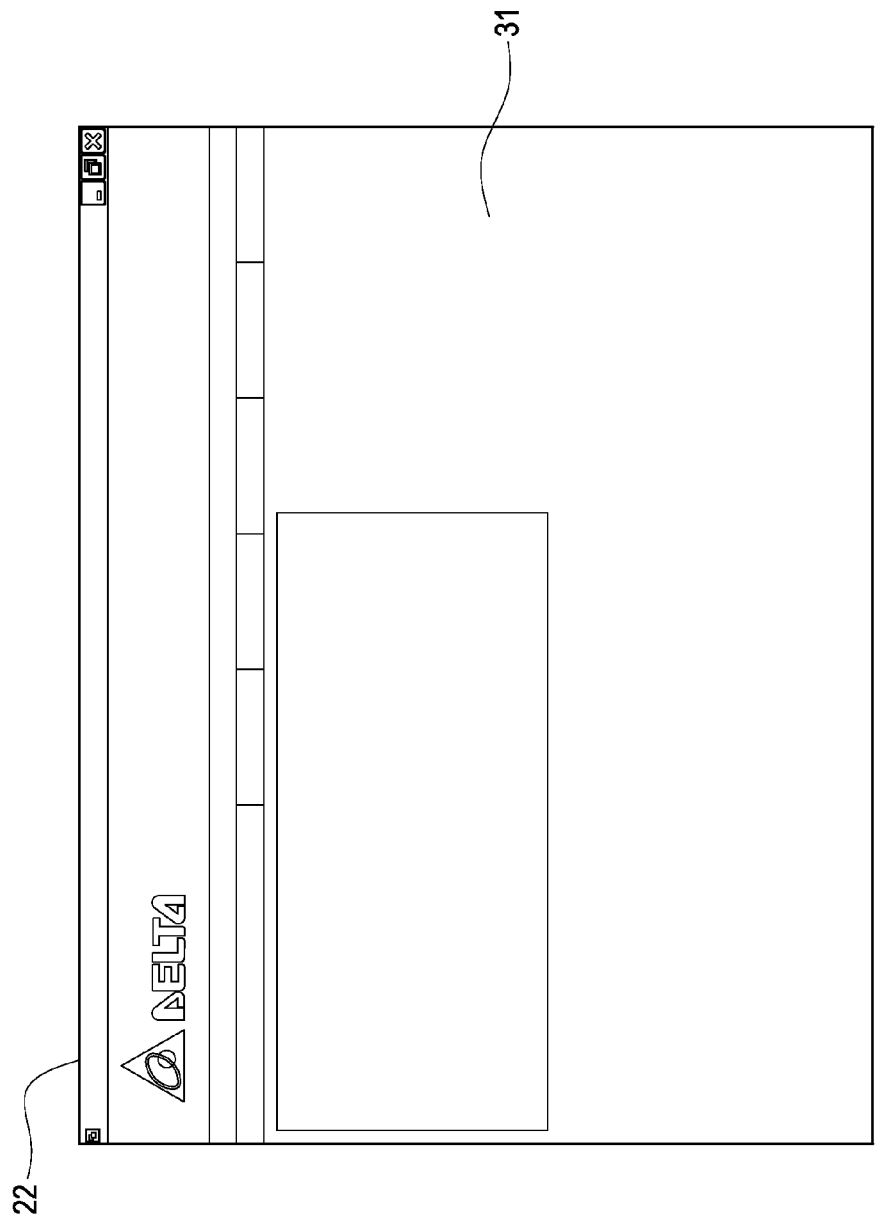
FIG. 2 is a schematic diagram of accessing web page of a preferred embodiment according to the present invention.
Figure 5A:
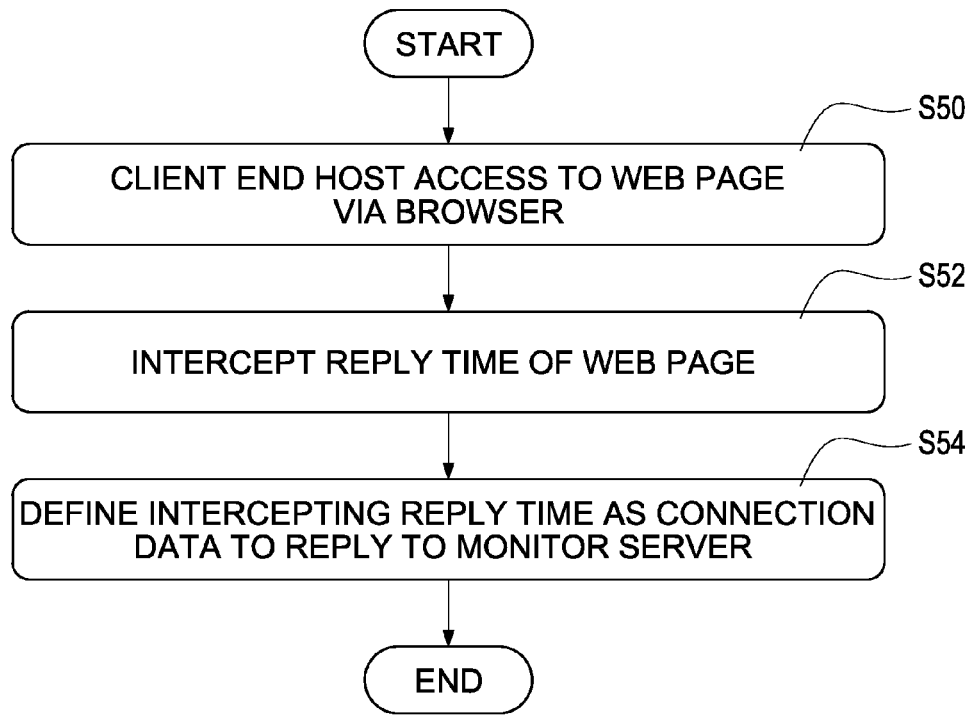
FIG. 5A is a reply flowchart e of a preferred embodiment according to the present invention.

FIG. 2 and FIG. 5A are a schematic diagram and a reply flowchart of a preferred embodiment according to the present invention. As shown in the diagrams, the client end host 2 provides a browser 22, and users connect to service procedures provided by each server 1 via the browser 22, for example accessing to a web page 31. In the process of accessing to the web page 3, the connection data I1 is replied to the monitor server 11. In the example shown in the FIG. 2, the browser 22 accesses to the homepage of Delta Electronics, Inc.

As shown in FIG. 5A, the client end host 2 first accesses to the web page 31 via the browser 22 (step S50). Next, the browser 22 intercepts reply time of the web page 31 (step S52). As shown in FIG. 1, each client end host 2 is individually installed with an application program 21. Specifically, the application program 21 is installed in the browser 22. In the step S52, each client end host 2 intercepting the reply time of the web page 31 via the application program 21 in the browser 22. Lastly, each client end host 2 defines the intercepting reply time as the connection data I1 to reply to the monitor server 11 (step S54).

The reply time in the embodiment refers to the time starting from the browser 22 accessing to the web page 31 to completely launching the web page 31. For example, if the time starting from entering the web address of the web page 31 in the browser 22 to completely launching the web page 31 is 0.5 second, the reply time is determined as 0.5 second by the application program 21.

In the profile 112 of the monitor server 11, the executing conditions of the computational procedure are predetermined (i.e., the condition for determining if the predetermined threshold value is reached). In the embodiment, the execution conditions are for example a proportion and a time limit. The client end host 2 considers the reply time as the connection data I1 to reply. When the proportion of the client end hosts 2 replying with the connection data I1 is higher than or equal to the predetermined proportion and the reply time in the connection data I1 is longer than the time limit, the predetermined threshold value is considered reached in the step S44.

For example, the administrator sets the proportion as 5% and the time limit as 0.5 second in the profile 112. The quantity of the client end hosts 2 is one hundred. The predetermined threshold value is reached when there are more than or equals to five client end hosts 2 replying with the connection data I1, and reply time of the connection data I1 is longer than 0.5 second. Then, the computational procedure and the migration are executed. The above embodiment is one of the preferred embodiments of the present invention and the scope of the invention is not limited thereto.

Figure 3:
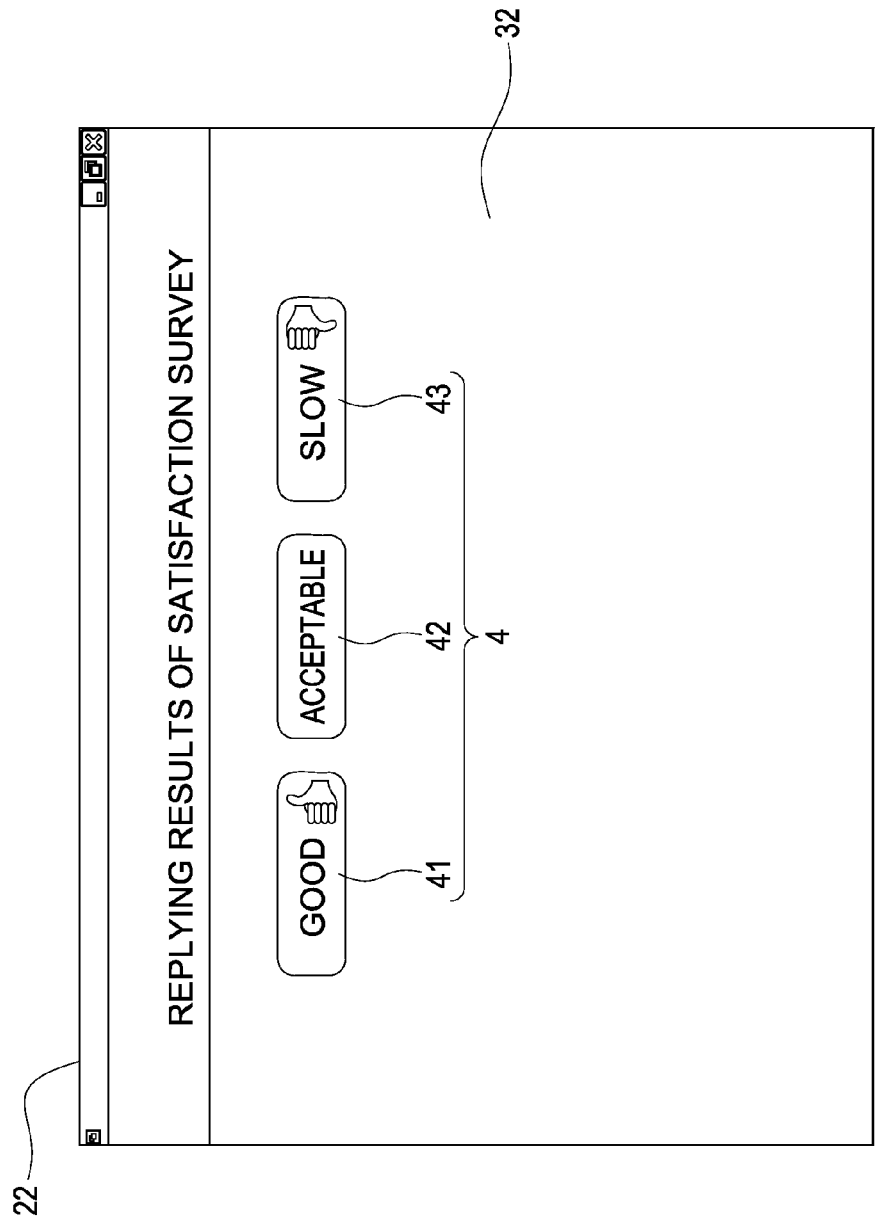
FIG. 3 is a schematic diagram of accessing web page of the other preferred embodiment according to the present invention.
Figure 5B:
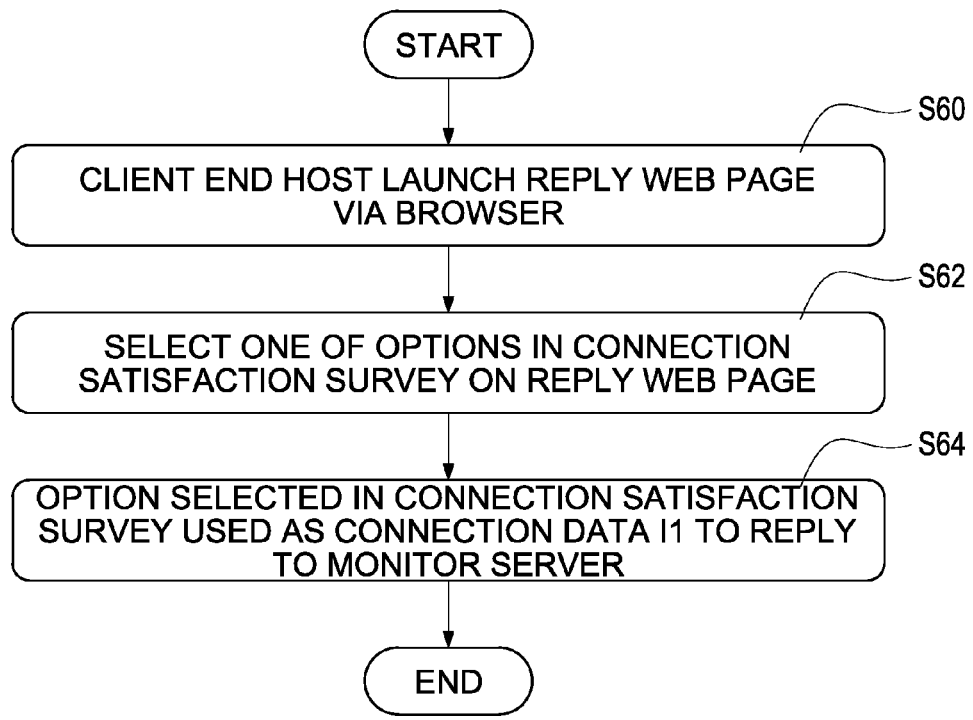
FIG. 5B is a reply flowchart e of the other preferred embodiment according to the present invention.

FIG. 3 and FIG. 5B are a schematic diagram and a reply flowchart of a preferred embodiment according to the present invention. In addition to automatically intercepting the reply time via the browser 22 and the application program 21, users are allowed to manually reply the connection data I1.

First, the client end host 2 launches a reply web page 32 via the browser 22 of the client end host 2 (step S60). Select one of the options in the connection satisfaction survey 4 on the reply web page 32 (step S62). The reply web page 32 is a web page made by the provider of the server 1, the reply web page 32 provides several icons representing the options of connection satisfaction survey 4 to the users for selection. As shown in FIG., the options of connection satisfaction survey 4 include option-connection is good 41, option-connection is acceptable 42, and option-connection is slow 43 etc. but are not limited thereto. In the step S62, users control input devices of the client end host 2 such as a mouse, a keyboard, a touch screen for selecting one of the options in the connection satisfaction survey 4. Lastly, the option selected by each client end host 2 is used as the connection data I1 to reply to the monitor server 11 (step S64).

As mentioned above, the executing condition of the computational procedure is predetermined in the profile 112 of the monitor server 11. In the embodiment, the condition is a proportion. When the proportion of the client end host 2 selecting the option-connection is slow 43 is higher than or equal to the predetermined proportion, the connection data I1 is determined to reach the predetermined threshold value in the step S44.

For example, the administrator set the proportion as 10% and the quantity of the client end hosts 2 is a hundred. When there are more than or above ten client end hosts 2 launching the reply web page 32, and selecting the option-connection is slow 43 on the reply web page 32, the monitor server 11 receives and calculates on the connection data I1. The calculation results indicate that the predetermined threshold value is reached and determines the computational procedure is required to be executed. The above example is one of the preferred embodiments according to the present invention and the scope of the invention is not limited thereto.

As mentioned above, the monitor server 11 is installed with the application program 111. When the application program 111 is loaded and executed at the monitor server 11, the monitor server 11 executes the above mentioned trigger method of computational procedure for virtual machine migration. The trigger method comprises the following steps: a) receiving reply connection data from at least one client end host 2; b) performing calculation on a plurality of the connection data; c) determining if the connection data reaches a predetermined threshold value; and d) triggering one of the plurality of servers 1 to initiate the computational procedure for migration of at least one virtual machine if the connection data reaches the predetermined threshold value.

As mentioned above, the monitor server 11 is further installed with at least one the profile 112. In the step c, the connection data is compared with the profile 112 for determining if the connection data reach the predetermined threshold value. In further details, a proportion and a time limit are predetermined in the profile 112 in the monitor server 11. In the step c, when the proportion of the client end hosts 2 replying with the connection data is higher than or equal to the predetermined proportion and the reply time of the connection data is longer than the time limit, the connection data is determined to reach the predetermined threshold value.

As the skilled person will appreciate, various changes and modifications can be made to the described embodiments. It is intended to include all such variations, modifications and equivalents which fall within the scope of the invention, as defined in the accompanying claims.

What is claimed is:

1. A method of triggering a computational procedure for virtual machine migration of one or more virtual machines individually operating in a plurality of cloud servers, the one or more virtual machines individually providing at least one service procedure, the method comprising:
   receiving reply connection data from at least one client end host;
   performing a calculation on the reply connection data;
   triggering at least one cloud server of the plurality of cloud servers to initiate the computational procedure for virtual machine migration of at least one virtual machine of the one or more virtual machines if the reply connection data is determined to reach a predetermined threshold value; and
   performing a virtual machine migration of at least one virtual machine of the one or more virtual machines at the plurality of cloud servers based on a computation result of the computational procedure, wherein a location for executing the one or more virtual machines after performing the virtual machine migration is based on the computational procedure, the computational procedure being configured to determine the location for executing the one or more virtual machines after performing the virtual machine migration based on internal server data associated with the cloud servers of the plurality of cloud servers, the internal server data describing one or more of a network speed, a central processing unit capability, a memory usage status, a temperature, a humidity of the location, or a rack location.

2. The method of claim 1, wherein the at least one cloud server of the plurality of cloud servers periodically executes the computational procedure for virtual machine migration.

3. The method of claim 1, wherein the at least one cloud server of the plurality of cloud servers comprises a monitor server installed with at least one profile, the method further comprising:

comparing the reply connection data and the at least one profile to determine if the reply connection data reaches the predetermined threshold value.

4. The method of claim 3, wherein the reply connection data comprises the connection address of the at least one client end host, and the monitor server determines to which service procedure the at least one client end host has access by way of the connection address for comparison to the profile.

5. The method of claim 3, wherein the monitor server initiates the computational procedure for virtual machine migration of the at least one virtual machine of the one or more virtual machines.

6. The method of claim 3, wherein the at least one client end host provides a browser for accessing the service procedure and intercepting the reply connection data to reply to the monitor server.

7. The method of claim 6, further comprising:

accessing a web page at the at least one client end host via the browser; and intercepting a reply time of the web page at the browser, the intercepted reply time being defined as the reply connection data that replies to the monitor server.

8. The method of claim 7, wherein the browser is installed with an application, and the browser intercepts the reply time of the web page by way of the application.

9. The method of claim 8, wherein a proportion and a time limit is predetermined in the profile of the monitor server, and if a proportion of the at least one client end host replying with the reply connection data is greater than or equal to the predetermined proportion, and the reply time of the reply connection data is greater than the predetermined time limit, the reply connection data is determined to reach the predetermined threshold value.

10. The method of claim 3, wherein the at least one client end host provides a browser, the method further comprising:

accessing a reply web page at the at least one client end host via the browser; and selecting an option in a connection satisfaction survey on the reply web page, the selected option in the connection satisfaction survey being defined as the reply connection data to reply to the monitor server.

11. The method of claim 10, wherein the connection satisfaction survey further comprises an option indicating that the reply connection data is slow, a proportion is predetermined in the profile of the monitor server, and if a proportion of the at least one client end host selecting the option indicating that the reply connection data is slow is greater than or equal to the predetermined proportion, the reply connection data is determined to reach the predetermined threshold value.

12. A method of triggering a computational procedure for virtual machine migration of one or more virtual machines individually operating in a plurality of cloud servers, the one or more virtual machines providing a plurality of service procedures, the method comprising:

accessing each service procedure individually at each client end host of a plurality of client end hosts by way of a browser;

receiving reply connection data from each client end host of the plurality of client end hosts at a monitor server of the plurality of cloud servers having a profile, the reply connection data being generated when each client end host of the plurality of client end hosts accesses the service procedures;

performing a calculation on the reply connection data at the monitor server;

comparing the calculation results with the profile and determining if the reply connection data reaches a predetermined threshold value;

initiating the computational procedure for virtual machine migration of at least one virtual machine of the one or more virtual machines at the monitor server if the predetermined threshold value is reached; and triggering at least one cloud server of the plurality of cloud servers to perform a virtual machine migration of at least one virtual machines of the one or more virtual machines based on a computation result of the computational procedure;

wherein a location for executing the one or more virtual machines after performing the virtual machine migration is based on the computational procedure, the computational procedure being configured to determine the location for executing the one or more virtual machines after performing the virtual machine migration based on internal server data associated with the cloud servers of the plurality of cloud servers, the internal server data describing one or more of a network speed, a central processing unit capability, a memory usage status, a temperature, a humidity of the location, or a rack location.

13. The method of claim 12, wherein the reply connection data comprises a connection address of each client end host of the plurality of client end hosts, and the monitor server determines to which service procedure each client end host of the plurality of client end hosts has access by way of the connection address for comparison to the profile.

14. The method of claim 12, wherein the browser is installed with an application, the method further comprising:

accessing each service procedure at each client end host of the plurality of client end hosts by way of the browser, the service procedure being a web page; and intercepting a reply time of the web page at the browser by way of the application, the intercepted reply time being defined as the reply connection data that replies to the monitor server.

15. The method of claim 14, wherein a proportion and a time limit is predetermined in the profile of the monitor server, and if a proportion of at least one client end host of the plurality of client end hosts replying with the reply connection data is greater than or equal to the predetermined proportion, and the reply time of the reply connection data is greater than the predetermined time limit, the reply connection data is determined to reach the predetermined threshold value.

16. The method of claim 12, further comprising:
accessing a reply web page at each client end host of the plurality of client end hosts by way of the browser; and
selecting an option in a connection satisfaction survey on the reply web page, the selected option in the connection satisfaction survey being defined as the reply connection data.

17. The method of claim 16, wherein the connection satisfaction survey further comprises an option indicating that the reply connection data is slow, a proportion is predetermined in the profile of the monitor server, and if a proportion of the at least one client end host selecting the option indicating that the reply connection data is slow is greater than or equal to the predetermined proportion, the reply connection data is determined to reach the predetermined threshold value.

18. A non-transitory computer-readable medium having one or more instructions that, when executed by a processor, trigger a computational procedure for virtual machine migration of one or more virtual machines individually operating on a plurality of cloud servers for individually providing at least one service procedure, the triggering comprising:
receiving reply connection data from at least one client end host;
performing a calculation on the reply connection data;
triggering one of the plurality of cloud servers to initiate the computational procedure for virtual machine migration of at least one virtual machine of the one or more virtual machines if the reply connection data is determined to reach a predetermined threshold value; and
performing a virtual machine migration of at least one virtual machine of the one or more virtual machines at the plurality of cloud servers based on a computation result of the computational procedure,
wherein a location for executing the one or more virtual machines after performing the virtual machine migration is based on the computational procedure, the computational procedure being configured to determine the location for executing the one or more virtual machines after performing the virtual machine migration based on internal server data associated with the cloud servers of the plurality of cloud servers, the internal server data describing one or more of a network speed, a central processing unit capability, a memory usage status, a temperature, a humidity of the location, or a rack location.

19. The non-transitory computer-readable medium of claim 18, wherein at least one cloud server of the plurality of cloud servers comprises a monitor server installed with at least one profile, the triggering further comprising:
comparing the reply connection data with the profile to determine if the reply connection data reaches the predetermined threshold value.

20. The non-transitory computer-readable medium of claim 19, wherein a proportion and a time limit is predetermined in the profile of the monitor server, and if a proportion of at least one client end host of the plurality of client end hosts replying with the reply connection data is greater than or equal to the predetermined proportion, and the reply time of the reply connection data is greater than the predetermined time limit, the reply connection data is determined to reach the predetermined threshold value.

* * * * *